United States Patent
Kim et al.

(10) Patent No.: US 11,367,451 B2
(45) Date of Patent: Jun. 21, 2022

(54) METHOD AND APPARATUS WITH SPEAKER AUTHENTICATION AND/OR TRAINING

(71) Applicant: Samsung Electronics Co., Ltd., Suwon-si (KR)

(72) Inventors: Kyuhong Kim, Seoul (KR); Insoo Kim, Seongnam-si (KR); Dohwan Lee, Suwon-si (KR); Hana Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 16/519,757

(22) Filed: Jul. 23, 2019

(65) Prior Publication Data

US 2020/0066280 A1 Feb. 27, 2020

(30) Foreign Application Priority Data

Aug. 27, 2018 (KR) .................. 10-2018-0100378

(51) Int. Cl.
| | |
|---|---|
| *G10L 17/04* | (2013.01) |
| *G10L 17/00* | (2013.01) |
| *G10L 15/16* | (2006.01) |
| *G06N 3/04* | (2006.01) |

(52) U.S. Cl.
CPC ............ *G10L 17/04* (2013.01); *G06N 3/0454* (2013.01); *G10L 15/16* (2013.01); *G10L 17/00* (2013.01)

(58) Field of Classification Search
CPC ....... G10L 15/22; G10L 17/02; G10L 21/028; G10L 17/06; G10L 17/00; G10L 15/08; G10L 25/18; G10L 2015/025; G10L 15/00; G10L 15/10; G10L 15/16; G10L 17/12; G10L 17/14; G10L 17/18; G10L 17/26; G10L 2015/221; G10L 21/02; G10L 21/0232; G10L 21/0272; G10L 25/24; G10L 25/30; G06F 3/167; G06F 21/32; G06F 40/35; G06F 16/7834; G06F 16/90332

See application file for complete search history.

(56) References Cited

U.S. PATENT DOCUMENTS

| | | | |
|---|---|---|---|
| 8,775,179 B2 * | 7/2014 | Seyfetdinov | ............ G10L 17/08 704/246 |
| 9,129,602 B1 | 9/2015 | Shepard et al. | |
| 9,293,129 B2 | 3/2016 | Zhao et al. | |
| 2015/0039313 A1 * | 2/2015 | Seyfetdinov | ............ G10L 17/08 704/246 |

(Continued)

FOREIGN PATENT DOCUMENTS

| | | | |
|---|---|---|---|
| JP | 2002-514318 A | 5/2002 | |
| JP | 2006-268563 A | 10/2006 | |

(Continued)

*Primary Examiner* — Linda Wong
(74) *Attorney, Agent, or Firm* — NSIP Law

(57) ABSTRACT

A speaker authentication method and apparatus may extract input speaker features corresponding to a plurality of frames of an input speech of an object, estimate discriminable speaker sections corresponding to the plurality of frames, and dynamically match the input speaker features to pre-enrolled enrolled speaker features based on the discriminable speaker section.

17 Claims, 10 Drawing Sheets

(56) References Cited

U.S. PATENT DOCUMENTS

| | | | |
|---|---|---|---|
| 2015/0301796 A1* | 10/2015 | Visser | G10L 15/22 |
| | | | 715/728 |
| 2016/0111112 A1* | 4/2016 | Hayakawa | G10L 25/45 |
| | | | 704/239 |
| 2016/0321953 A1 | 11/2016 | Kang | |
| 2017/0069327 A1 | 3/2017 | Heigold et al. | |
| 2017/0229133 A1* | 8/2017 | Bilobrov | G10L 19/018 |
| 2019/0228779 A1* | 7/2019 | Lesso | G10L 17/18 |

FOREIGN PATENT DOCUMENTS

| | | |
|---|---|---|
| KR | 10-2004-0028790 A | 4/2004 |
| KR | 10-2016-0056734 A | 5/2016 |

\* cited by examiner

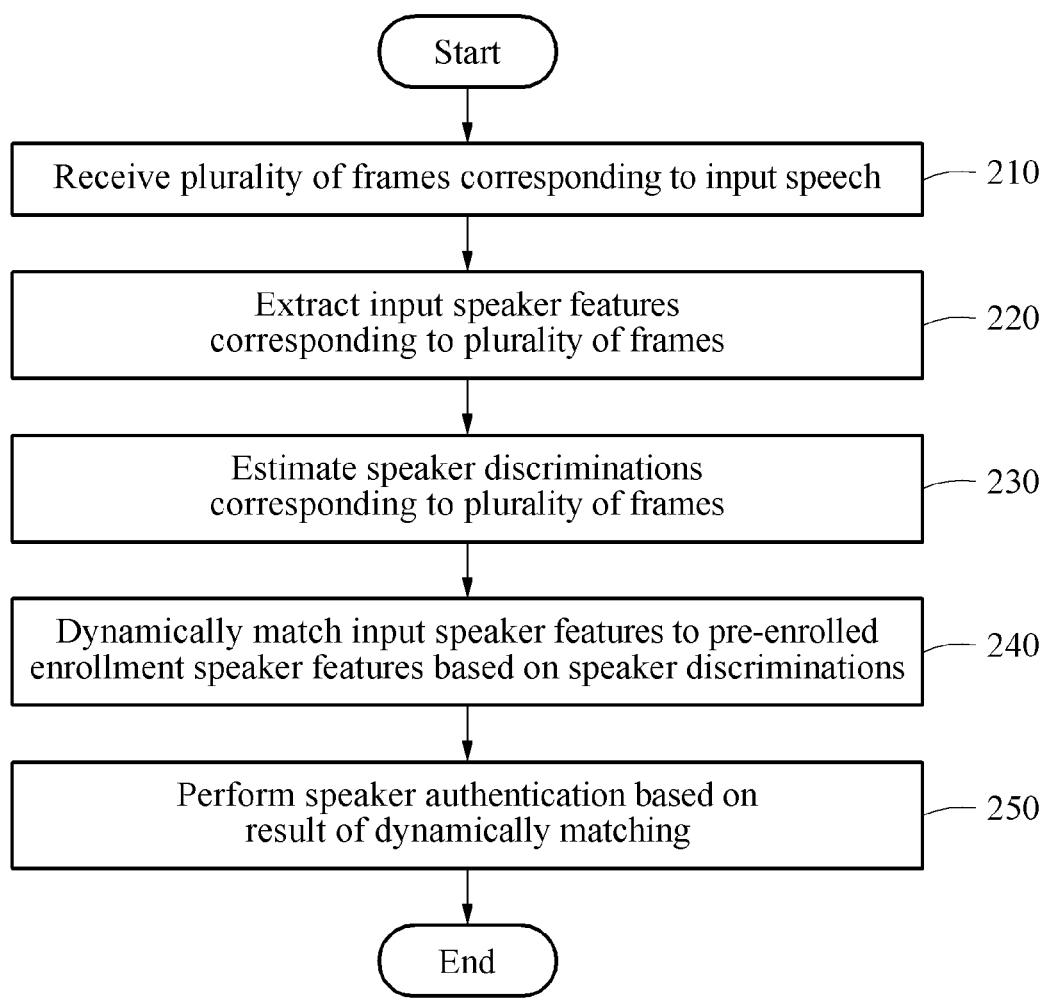

METHOD AND APPARATUS WITH SPEAKER AUTHENTICATION AND/OR TRAINING

CROSS-REFERENCE TO RELATED APPLICATIONS

This application claims the benefit under 35 USC § 119(a) of Korean Patent Application No. 10-2018-0100378 filed on Aug. 27, 2018 in the Korean Intellectual Property Office, the entire disclosure of which is incorporated herein by reference for all purposes.

BACKGROUND

1. Field

The following description relates to a method and apparatus with speaker authentication and/or training thereof.

2. Description of Related Art

Since a language may be spoken with different oral structures, and even vocalized differently at different points in time by the same speaker, various different pronunciations may exist. There may be two main causes of such a difference in vocalization: first, a change in utterance method of the same speaker (for example, a change in utterance speed or intonation); and second, a difference in oral structure, that is, vocal track between different speakers. In general, a scoring scheme used for a speaker recognition algorithm may desirably be insensitive to a change in utterance method of the same speaker and sensitive to a difference in vocal organ between different speakers. However, in practice, scoring schemes have a characteristic of being sensitive to a difference in an utterance method of the same speaker and also sensitive to a difference in the vocal organ of different speakers, which limits the ability to discriminate speakers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speaker authentication method includes receiving frames corresponding to an input speech, extracting input speaker features corresponding to the frames, estimating discriminable speaker sections corresponding to the frames, dynamically matching the input speaker features to pre-enrolled enrolled speaker features based on the discriminable speaker sections, and performing a speaker authentication based on a result of the dynamically matching.

The dynamically matching may include selecting input speaker features having discriminable speaker sections being greater than or equal to a threshold among the discriminable speaker sections, and dynamically matching the selected input speaker features to the enrolled speaker features.

The dynamically matching may include dropping an input speaker feature having a discriminable speaker section being less than a threshold among the discriminable speaker sections, dropping an enrolled speaker feature corresponding to the dropped input speaker feature, and dynamically matching remaining input speaker features excluding the dropped input speaker feature to remaining enrolled speaker features excluding the dropped enrolled speaker feature.

The dynamically matching may include assigning a weight to input speaker features having discriminable speaker sections being greater than or equal to a threshold among the discriminable speaker sections, and dynamically matching the weight-assigned input speaker features to the enrolled speaker features.

The dynamically matching may include dropping an input speaker feature corresponding to a short pause among the input speaker features, and dynamically matching remaining input features excluding the dropped input speaker feature to the enrolled speaker features.

The dynamically matching may include assigning a first weight to an input speaker feature corresponding to a short pause among the input speaker features, assigning a second weight to an input speaker feature corresponding to a speech among the input speaker features, and dynamically matching each of the first weight-assigned input speaker feature and the second weight-assigned input speaker feature to the enrolled speaker features.

The dynamically matching may include aligning enrolled speaker features representing phonemes identical to phonemes represented by the input speaker features, and dynamically matching the input speaker features to the aligned enrolled speaker features.

The performing may include outputting a distance corresponding to the input speech by accumulating results of the dynamically matching, and performing the speaker authentication based on a result of comparing the distance to a threshold.

The extracting may include extracting the input speaker features based on per-frequency energies of the frames.

In another general aspect, a training method includes receiving training frames corresponding to a training speech, extracting a speaker feature for each of the training frames based on the training fames and speaker information for each of the training frames, and training a first neural network to recognize a speaker for each of the training frames based on the speaker feature for each of the training frames, and training a second neural network to estimate a discriminable speaker section for each of the training frames based on a speaker recognition result for each of the training frames output by the trained first neural network.

The first neural network may include a first-first neural network configured to extract the speaker feature for each of the training frames, and a first-second neural network configured to identify the speaker for each of the training frames.

The first-second neural network may include a softmax layer.

The training of the first neural network may include training the first-first neural network and the first-second neural network based on a loss between the speaker information for each of the training frames and the speaker for each of the training frames identified by the first-second neural network.

The training of the second neural network may include determining a speaker identification level for each of the training frames based on the speaker recognition result for each of the training frames output by the trained first neural network, and training the second neural network to estimate the discriminable speaker section for each of the training frames based on the training frames and the speaker identification level for each of the training frames.

The first-first neural network may include a deep neural network (DNN) including layers, wherein the training of the second neural network may include determining a speaker identification level for each of the training frames based on the speaker recognition result for each of the training frames output by the trained first neural network, and training the second neural network to estimate the discriminable speaker section for each of the training frames based on speaker features output from one of the layers and the speaker identification level for each of the training frames.

In still another general aspect, a speaker authentication apparatus includes a communication interface configured to receive frames corresponding to an input speech, and a processor configured to extract input speaker features corresponding to the frames, estimate discriminable speaker sections corresponding to the frames, dynamically match the input speaker features to pre-enrolled enrolled speaker features based on the discriminable speaker sections, and perform a speaker authentication based on a result of the dynamically matching.

The processor may be configured to select input speaker features having discriminable speaker sections being greater than or equal to a threshold among the discriminable speaker sections, and dynamically match the selected input speaker features to the enrolled speaker features.

The processor may be configured to drop an input speaker feature having a discriminable speaker section being less than a threshold among the discriminable speaker sections, and dynamically match remaining input speaker features excluding the dropped input speaker feature to the enrolled speaker features.

The processor may be configured to assign a weight to input speaker features having discriminable speaker sections being greater than or equal to a threshold among the discriminable speaker sections, and dynamically match the weight-assigned input speaker features to the enrolled speaker features.

In still another general aspect, a speaker authentication method includes extracting input speaker features corresponding to speech frames, determining discriminable speaker sections in each of the speech frames based on a criteria, dynamically matching the input speaker features to pre-enrolled enrolled speaker features based on the discriminable speaker sections, and authenticating a speaker based on the dynamically matched input speaker features.

The input speaker features may include phonemes and the discriminable speaker sections may include of voiced consonant sounds.

The criteria may be satisfied when a discriminable speaker section of the discriminable speaker sections is greater than or equal to a threshold value.

The criteria may be determined based on comparisons of relative weights applied to the discriminable speaker sections.

Other features and aspects will be apparent from the following detailed description, the drawings, and the claims.

BRIEF DESCRIPTION OF THE DRAWINGS

FIG. 2 is a flowchart illustrating an example of a speaker authentication method.

Figure 1A:
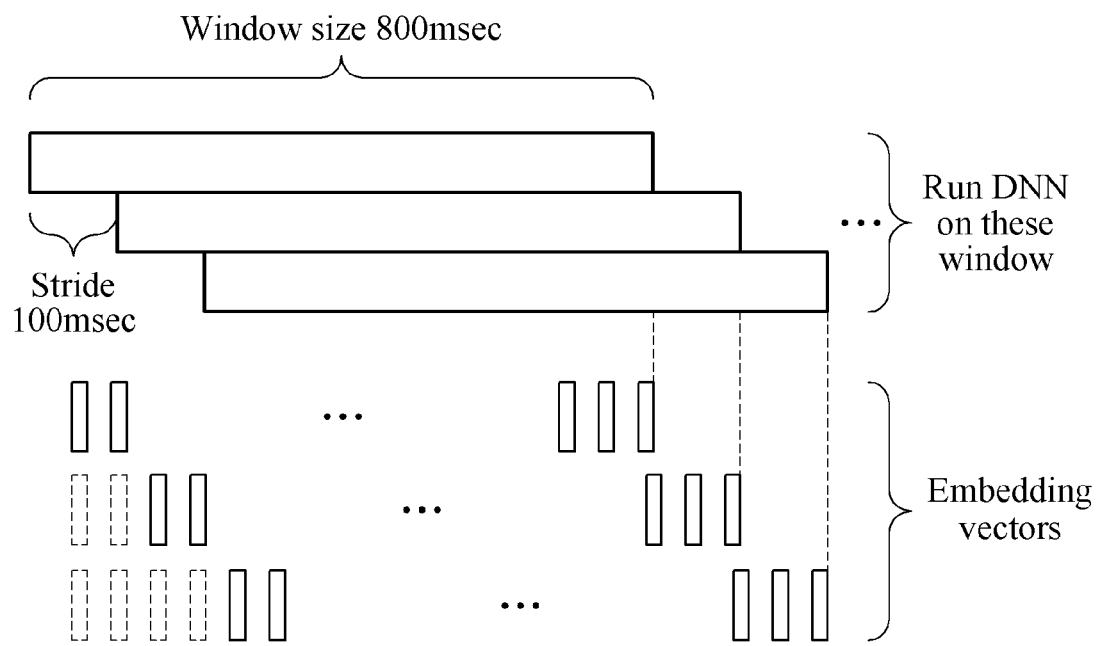
FIGS. 1A and 1B illustrate an example of a speaker authentication method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood by one of ordinary skill in the art in view of the disclosure of this application. Terms defined in dictionaries generally used should be construed to have meanings matching with contextual meanings in the related art and the disclosure of this application, and are not to be construed as an ideal or excessively formal meaning unless otherwise defined herein.

Examples set forth hereinafter may be, and implemented as, any of various types of products such as a personal computer, a laptop computer, a tablet computer, a smartphone, a television, a smart home appliance, an intelligent vehicle, a kiosk, and a wearable device. For example, the examples may be applied to a smartphone, a mobile device, and a smart home system to recognize a speaker (user) and perform speaker authentication. The examples may be applied to perform various control operations such as payment and speaker-customized operations through speaker recognition. Hereinafter, the examples will be described in detail with reference to the accompanying drawings, wherein like drawing reference numerals are used for like elements.

Figure 1B:
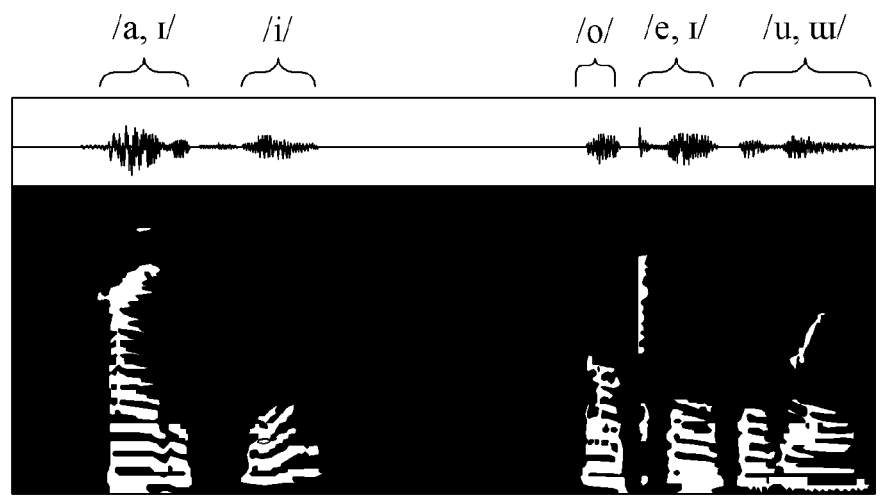

FIGS. 1A and 1B illustrate an example of a speaker authentication method. A speaker authentication apparatus is an apparatus that processes information to authenticate and identify a speaker after a speech recognition is performed. The speaker authentication apparatus may be implemented, for example, a hardware module, or a combination of hardware and a medium with instructions. The speaker authentication apparatus generates or processes an operation, a calculation, and an instruction related to recognition of a speaker. The speaker authentication apparatus may be mounted in various computing devices and/or systems such as a smartphone, a tablet computer, a laptop computer, a desktop computer, a television, a wearable device, a security system, and/or a smart home system.

Referring to FIG. 1A, an example of extracting an embedding vector from a speech signal that includes phonetic information is illustrated.

The speech signal including the phonetic information may be divided by various units such as, for example, an utterance, a window, and a frame. For example, a single frame may be defined as a unit including phonetic information corresponding to 100 milliseconds (msec) or 10 msec, for example in a non-limiting example. The speaker authentication apparatus obtains a plurality of frames corresponding to an input speech. The speaker authentication apparatus estimates the speaker of an embedding vector corresponding to a vocalization of a speech recognized using a neural network.

Hereinafter, a speech recognition process performed before a speaker recognition will be described in brief.

In general, a speech recognition is performed by a speech recognition model that may include an acoustic model and a language model. The acoustic model may be a model that recognizes a speech signal from features extracted from the speech signal on a phoneme basis. For example, a speech recognition apparatus estimates words represented by a speech signal based on a result of recognizing the speech signal obtained by the acoustic model on a phoneme basis. The acoustic model may be implemented as a neural network, for example, in various structures such as a Gaussian mixture model (GMM), a deep neural network (DNN), and a bidirectional long short term memory (BLSTM). In addition, the language model may be a model designed to obtain probability information based on a connection relation between words. The language model may provide probability information related to a subsequent word to follow a word input into the language model. For example, in a case in which a word "this" is input into the language model, the language model provides probability information that "is" or "was" to follow "this". A speech recognition system selects a highest-probability connection relation between words based on the probability information provided by the language model and outputs a result of the selection as a speech recognition result.

In an example, a method of authenticating a speaker based on the premise that the speech recognition described above is completed. The speaker authentication apparatus matches vocalization sections between an enrollment utterance of an enrolled speaker (or enrolled speaker features) and an input utterance of an input speaker (or input speaker features), and identifies and/or authenticates a speaker by examining a difference between the speakers. In these examples, the speech recognition system, the speech recognition apparatus, and the authentication apparatus may each include one or more processors configured to execute the respective recognition and authentication operations described herein. In addition, examples exist where any one of the speech recognition system, speech recognition apparatus, and speech authentication apparatus may include one or more processors configured to execute both the respective recognition and authentication operations described herein. Accordingly, while the below explanations may separately refer to any one of the speech recognition system, speech recognition apparatus, or speech authentication apparatus, it should be understood that such explanations are also with reference to the remaining of the speech recognition system, speech recognition apparatus, or speech authentication apparatus. Additionally, while such hardware speech recognition system, speech recognition apparatus, and speech authentication apparatus may be configured through hardware alone, examples also include such hardware or systems including memories storing respective instructions, which when executed by the respective one or more processors, configure the respective one or more processors to implement any one, any combination, or all operations described herein, including with respect to either or both of the speech recognition and speech authentication operations described herein.

Thus, in an enrollment operation performed by the speech authentication apparatus, the enrolled speaker features are extracted by dividing a vocalization of the enrolled speaker on a segment bases, and storing and utilizing the enrolled speaker features as a template of the enrolled speaker.

Referring to FIG. 1B, distinctive voiced sounds in an input speech that can be discriminated between speakers are illustrated. By dynamically matching input speaker features to enrolled speaker features based on frames (or speaker features) having strong discriminations between speakers, a speaker authentication performance improves.

FIG. 2 is a flowchart illustrating an example of a speaker authentication method. Referring to FIG. 2, in operation 210, a speaker authentication apparatus receives a plurality of frames corresponding to an input speech.

In operation 220, the speaker authentication apparatus extracts input speaker features corresponding to the plurality of frames. The speaker authentication apparatus extracts the input speaker features based on per-frequency energies of the plurality of frames. The greater the energy, the larger the frequency and the shorter (smaller) the wavelength of the plurality of frames. An input speaker feature is also referred to as a "feature vector of an input speaker" or an "embedding vector of an input speaker".

In operation 230, the speaker authentication apparatus estimates discriminable speaker sections corresponding to the plurality of frames. A discriminable speaker section is also referred to as an "attention."

In operation 240, the speaker authentication apparatus dynamically matches the input speaker features to pre-enrolled enrolled speaker features based on the discriminable speaker sections. Examples of the speaker authentication apparatus performing the matching will be described in detail with reference to FIGS. 3 through 5.

In operation 250, the speaker authentication apparatus authenticates a speaker based on a result of the dynamic matching in operation 240. The speaker authentication apparatus authenticates the speaker based on a distance or a similarity corresponding to the result of the dynamic matching.

Figure 3:
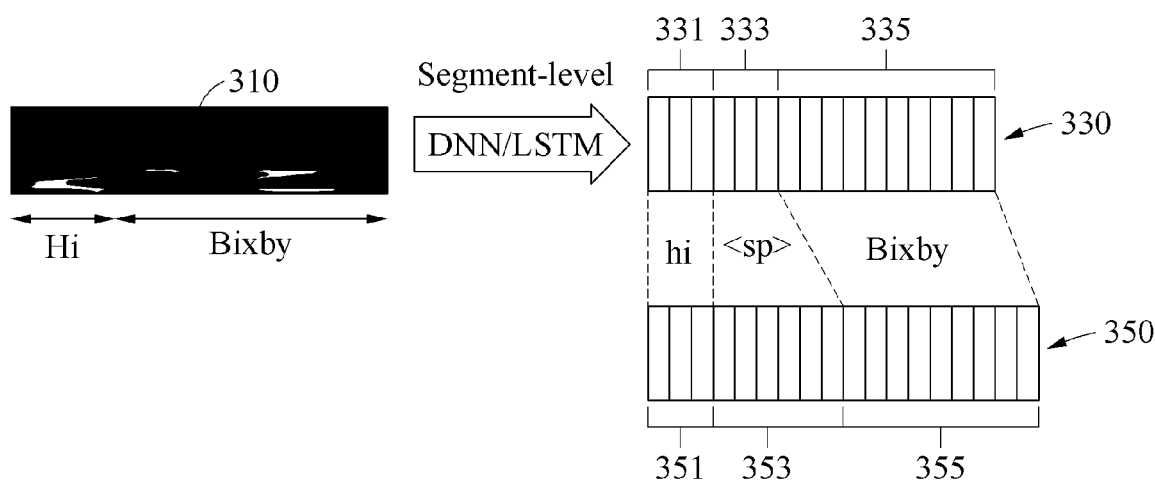
FIG. 3 through 5 illustrate examples of dynamically matching input speaker features to enrolled speaker features.

FIG. 3 illustrates an example of dynamically matching input speaker features to enrolled speaker features. Referring to FIG. 3, an example of dynamically matching speaker features to minimize the effect of an utterance difference is illustrated.

As described above, each speaker has a different vocalization and performs each vocalization in a different length or utterance manner. For example, with respect to the phrase "Hi, Bixby," a user A pronounces the sentence as /haːɪ, bɪksbɪ/, and a user B pronounces the sentence as /haɪ, biːksbɪ/. As described above, each speaker has a different vocalization length or a different utterance method for the same sentence.

In response to a reception of an input speech (or input utterance) 310 to be evaluated, the speaker authentication apparatus recognizes and/or authenticates a speaker by extracting a plurality of input speaker features 330 of segment units with respect to the input speech 310 and comparing (or matching) the input speaker features 330 to pre-enrolled enrolled speaker features 350. The speaker authentication apparatus minimizes a change in utterance content by comparing (or matching) the same phonetic information between the input speaker features 330 and the pre-enrolled enrolled speaker features 350, and measures a matching distance to be sensitive to changes between speakers.

The speaker authentication apparatus aligns enrolled speaker features 350 representing phonemes identical to phonemes represented by the input speaker features 330. The speaker authentication apparatus aligns input speaker features 331 corresponding to "Hi" and enrolled speaker features 351 corresponding to "Hi". Further, the speaker authentication apparatus aligns input speaker features 335 corresponding to "Bixby" and enrolled speaker features 355 corresponding to "Bixby". In this example, the speaker authentication apparatus also aligns input speaker features 333 and enrolled speaker features 353 corresponding to a short pause section between "Hi" and "Bixby".

The speaker authentication apparatus matches the input speaker features 330 to the aligned enrolled speaker features 350. The speaker authentication apparatus dynamically matches the input speaker features 330 to the enrolled speaker features 350 respectively corresponding to "Hi," the short pause section, and/or "Bixby". The speaker authentication apparatus may authenticate a speaker by identifying a speaker based on a matching distance and/or a similarity score between the matched speaker features.

Through the dynamic matching of aligning and matching speaker features representing the same phonemes, effects of variability of different utterances for each speaker is minimized.

Figure 4:
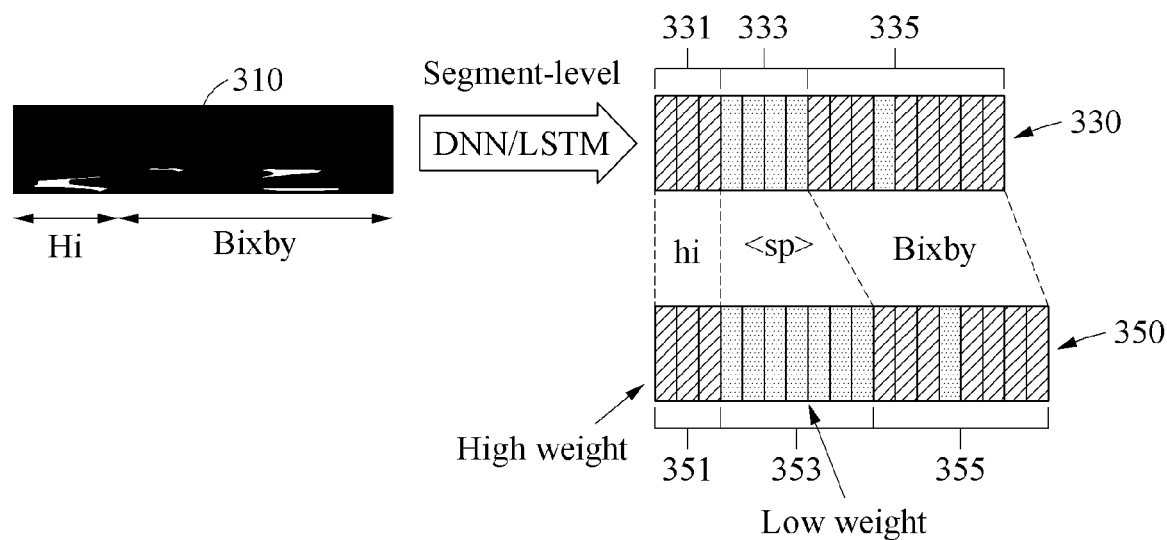

FIG. 4 illustrates an example of dynamically matching input speaker features to enrolled speaker features. Referring to FIG. 4, a process of automatically detecting a discriminative section corresponding to a plurality of frames and dynamically matching input speaker features to enrolled speaker features based on discriminable speaker sections corresponding to the discriminative section is illustrated.

In the example of FIG. 4, input speaker features 331 and enrolled speaker features 351 corresponding to "Hi" or input speaker features 335 and enrolled speaker features 355 corresponding to "Bixby" include phonetic information, and thus correspond to a section having a discriminable speaker section. In particular, "i" of "Hi," and "i" and "y" of "Bixby" correspond to voiced sounds, and thus have relatively high discriminable speaker sections (or speaker distinctions) of corresponding speaker features. Thus, discriminable speaker sections comprise voiced consonant sounds where the vocal cords vibrate.

In contrast, a short pause section corresponding to input speaker features 333 and enrolled speaker features 353 does not include any phonetic information and thus, correspond to a section with little to no discernible discriminable speaker section. If such a non-discriminative section is included in an authentication evaluation, the speaker recognition performance may decrease. Thus, by using a discriminable speaker section to estimate a discriminative section or a section having a relatively high discernible discrimination, the speaker recognition performance improves.

In detail, a speaker authentication apparatus performs dynamic matching using input speaker features corresponding to a section having a discriminable speaker section. The speaker authentication apparatus selects input speaker features having discriminable speaker sections being greater than or equal to a threshold among the discriminable speaker sections corresponding to the plurality of frames, and dynamically matches the selected input speaker features to the enrolled speaker features.

The speaker authentication apparatus assigns relative weights to the input speaker features 331, 33, and 335. The speaker authentication apparatus assigns a first weight to the input speaker features 333 corresponding to a short pause among the input speaker features and assigns a second weight (relatively high weight) to the input speaker features 331, 335 corresponding to a speech among the input speaker features. In this example, the first weight may be a weight lower than the second weight. For example, the first weight is "0.001," and the second weight is "0.9". The speaker authentication apparatus dynamically matches each of the first weight-assigned input speaker features and the second weight-assigned input speaker features to the enrolled speaker features. In this example, enrolled speaker features respectively matching the input speaker features are also assigned with a weight, like the input speaker features.

Further, the speaker authentication apparatus assigns a weight only to input speaker features having discriminable speaker sections being greater than or equal to a threshold among the discriminable speaker sections, and dynamically matches the weight-assigned input speaker features to the enrolled speaker features. In another example, the speaker authentication apparatus assigns a relatively high weight to speaker features corresponding to voiced sounds among speaker features representing phonetic information, and assigns a relatively low weight to less distinctive features, for example, a nasal or a short pause.

Figure 5:
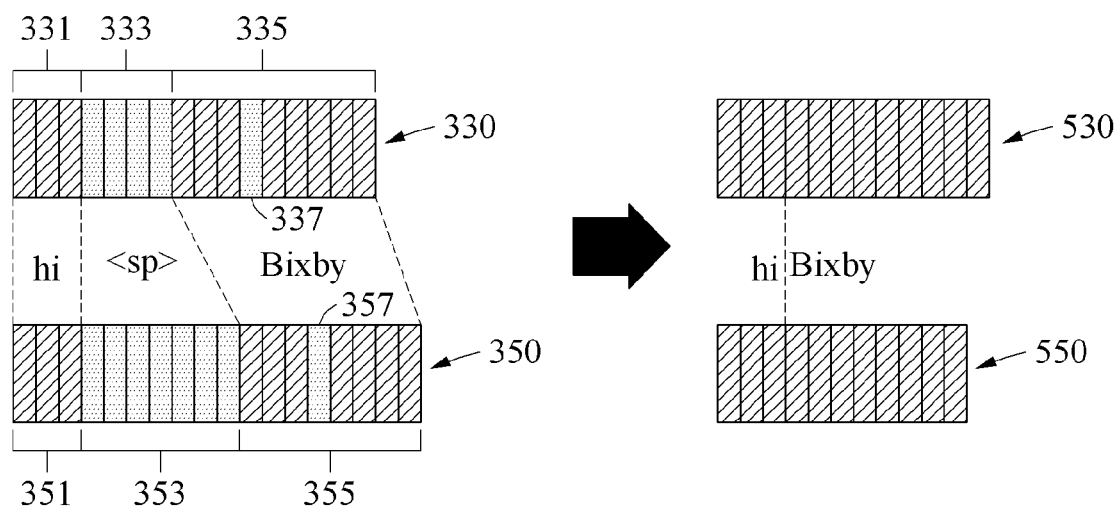

FIG. 5 illustrates an example of dynamically matching input speaker features to enrolled speaker features.

As described above, a short pause section includes little to no discriminable speaker section between speakers, and thus, a segment corresponding to the short pause section may be dropped, in an example, and speaker features having discriminable speaker sections greater than or equal to a predetermined level are dynamically matched.

For example, it is assumed that discriminable speaker sections of speaker features corresponding to a short pause section are less than a predetermined threshold. A speaker authentication apparatus drops input speaker features 333 having discriminable speaker sections being less than the threshold for discriminable speaker sections. The speaker authentication apparatus also drops enrolled speaker features 353 aligned to correspond to the input speaker features 333. In this example, a non-distinctive speaker feature 337, 357 corresponding to a short pause or a nasal sound, which corresponds to a speech section that is not sounded in practice, is also dropped, similar to the short pause section described above.

The speaker authentication apparatus dynamically matches input speaker features 530 (the remaining input speaker features 331 and 335 excluding the input speaker features 333 and 337) to enrolled speaker feature 550 (the remaining enrolled speaker features 351 and 355 excluding the enrolled speaker features 353 and 357).

Figure 6:
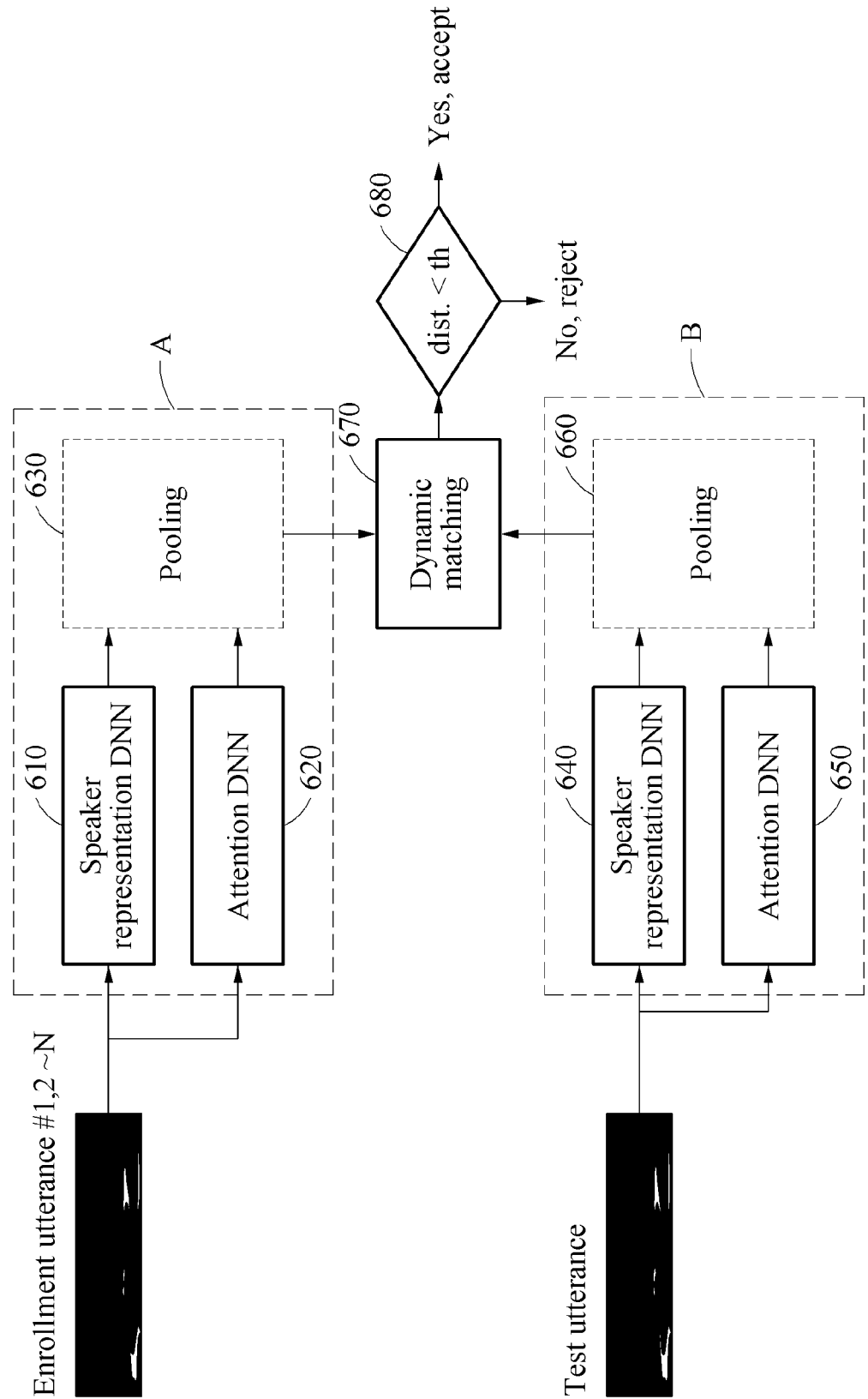
FIG. 6 illustrates an example of an operation of a speaker authentication apparatus.

FIG. 6 illustrates an example of an operation of a speaker authentication apparatus. Referring to FIG. 6, a speaker authentication apparatus 600 includes an enrollment processor A configured to process enrolled speaker features and an input processor B configured to process input speaker features to be tested (authenticated).

The speaker authentication apparatus 600 includes a speaker representation DNN 610, 640, an attention DNN 620, 650, a pooling layer 630, 660, a dynamic matcher 670, and a comparator 680. The speaker representation DNN 610, the attention DNN 620, and the pooling layer 630 correspond to the enrollment processor A, and the speaker representation DNN 640, the attention DNN 650, and the pooling layer 660 correspond to the input processor B.

In response to an input of a plurality of enrollment frames corresponding to an enrollment speech (enrollment utterance), the speaker authentication apparatus 600 extracts enrolled speaker features corresponding to enrollment frames using the speaker representation DNN 610. Further, the speaker authentication apparatus 600 estimates discriminable speaker sections corresponding to the enrollment frames using the attention DNN 620. In this example, if the number of enrolled speaker features is "N," the number of estimated discriminable speaker sections is also "N" which is equal to the number of enrolled speaker features.

The pooling layer 630 drops enrolled speaker feature(s) corresponding to a short pause section among the N enrolled speaker features. The pooling layer 630 drops less distinctive enrolled speaker feature(s) based on the discriminable speaker sections corresponding to the enrollment frames, thereby decreasing the number of enrolled speaker features to "M" (M being a natural number less than N). An operation of the pooling layer 630 is marked with a broken line to indicate that the operation of the pooling layer 630 is selectively performed.

The speaker authentication apparatus 600 performs the same operation on input frames to be tested or authenticated (test utterance), similar to the enrollment frames.

In response to an input of a plurality of input frames corresponding to an input speech, the speaker authentication apparatus 600 extracts input speaker features corresponding to the input frames using the speaker representation DNN 640. Further, the speaker authentication apparatus 600 estimates discriminable speaker sections corresponding to the input frames using the attention DNN 650. In this example, if the number of input speaker features is "P," the number of estimated discriminable speaker sections is also "P," which is equal to the number of input speaker features.

The pooling layer 660 drops input speaker feature(s) corresponding to a short pause section among the P input speaker features. The pooling layer 660 drops less distinctive enrolled speaker feature(s) based on the discriminable speaker sections corresponding to the input frames, thereby decreasing the number of input speaker features to "M" or "N". An operation of the pooling layer 660 is marked with a broken linen to indicate that the operation of the pooling layer 660 is selectively performed.

The speaker authentication apparatus 600 dynamically matches an output of the pooling layer 630 of processor A to an output of the pooling layer 660 of processor B using the dynamic matcher 670. The dynamic matcher 670 aligns the output of the pooling layer 630 and the output of the pooling layer 660 for each of the same phonemes using various dynamic matching algorithms, for example. The dynamic matching algorithms include, for example, dynamic time warping (DTW) and dynamic programming.

The comparator 680 calculates a matching distance (dist.) corresponding to the input speech by accumulating results of the dynamically matched pooling performed by the dynamic matcher 670. The comparator 680 authenticates a speaker based on the result of comparing the matching distance to a threshold. For example, the comparator 680 accepts the speaker authentication in response to the matching distance being less than the threshold and rejects the speaker authentication in response to the matching distance being greater than or equal to the threshold.

In an example, the comparator 680 calculates a similarity score corresponding to the input speech by accumulating the results of the dynamically matched pooling performed by the dynamic matcher 670. In this example, the comparator 680 accepts the speaker authentication in response to the similarity score being greater than a threshold and rejects the speaker authentication in response to the similarity score being less than or equal to the threshold.

Figure 7:
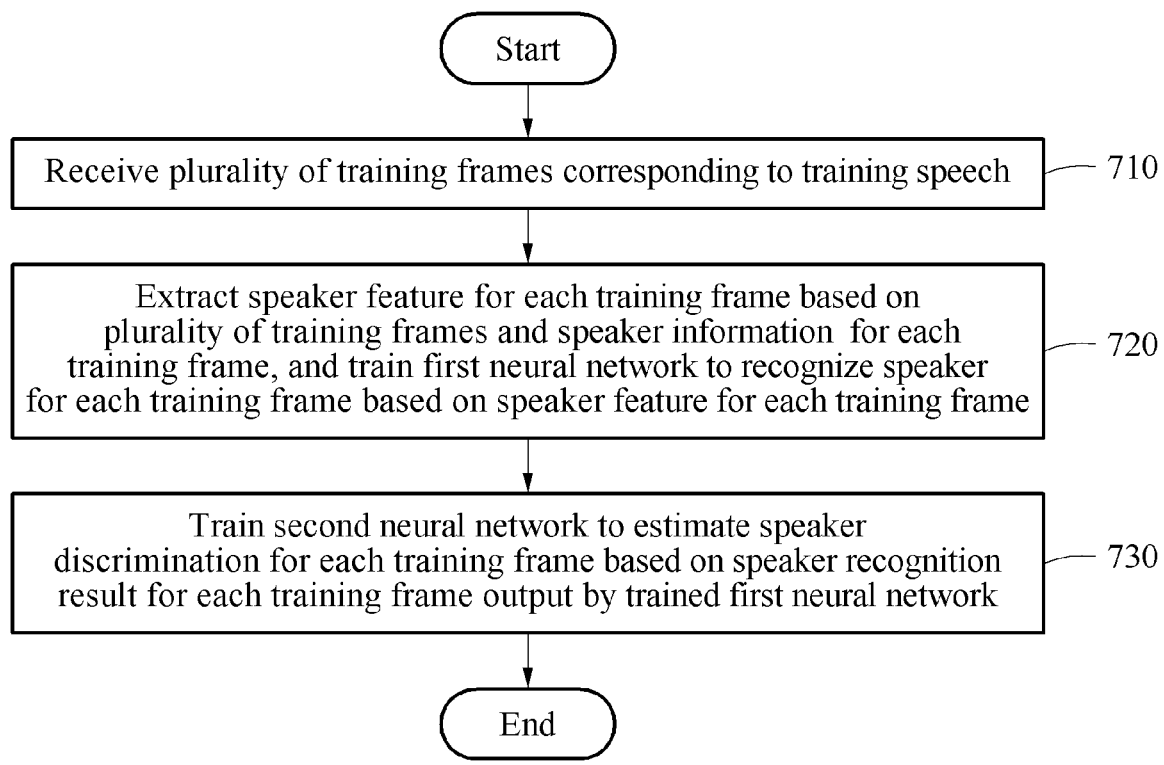
FIG. 7 is a flowchart illustrating an example of a training method for speaker authentication.

FIG. 7 is a flowchart illustrating an example of a training method for speaker authentication. Referring to FIG. 7, in operation 710, a training apparatus receives a plurality of training frames corresponding to a training speech.

In operation 720, the training apparatus extracts a speaker feature for each training frame based on the plurality of training frames and speaker information for each of the training frames, and trains a first neural network to recognize a speaker for each of the training frames based on the speaker feature for each of the training frames. Here, the speaker information for each training frame corresponds to a ground truth corresponding to a speaker for each of the training frames to be recognized by the first neural network, that is, a ground truth speaker of the training speech. The first neural network includes, for example, a first-first neural network configured to extract the speaker feature for each of the training frames, and a first-second neural network configured to identify the speaker for each of the training frames. In operation 720, the training apparatus trains the first-first neural network and the first-second neural network based on a loss between the speaker information for each of the training frames and the speaker for each of the training frames identified by the first-second neural network. A structure and operation of the first neural network will be described in detail with reference to FIG. 8.

In operation 730, the training apparatus trains a second neural network to estimate a discriminable speaker section for each of the training frames based on a speaker recognition result for each of the training frames output by the trained first neural network. Here, the speaker recognition result for each of the training frame corresponds to a ground truth corresponding to a discriminable speaker section for each of the training frames to be estimated by the second neural network.

In operation 730, the training apparatus determines a speaker identification level for each of the training frames based on the speaker recognition result for each of the training frames output by the trained first neural network. The training apparatus trains the second neural network to estimate the discriminable speaker section for each training frame based on the plurality of training frames and the speaker identification level for each of the training frames. An example of the training apparatus training the second neural network based on the plurality of training frames and the speaker identification level for each of the training frames will be described in detail with reference to FIG. 8.

The training apparatus trains the second neural network to estimate the discriminable speaker section for each training frame based on speaker features output from one of a plurality of layers of the first-first neural network (for example, an intermediate hidden layer) and the speaker identification level for each of the training frames. An example of the training apparatus training the second neural network based on the speaker features output from the hidden layer of the first-first neural network and the speaker identification level for each of the training frames will be described in detail with reference to FIG. 9.

Figure 8:
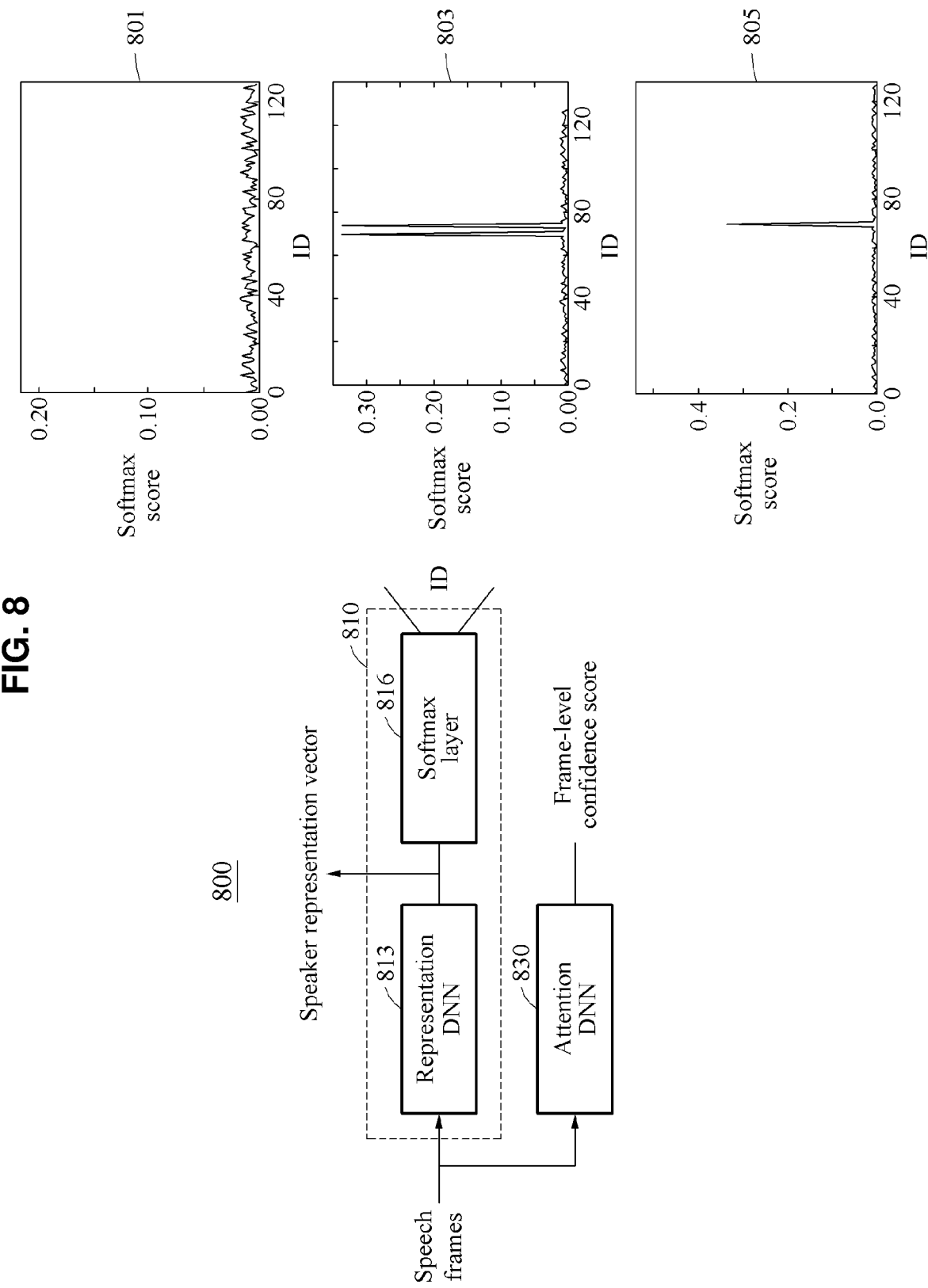
FIGS. 8 and 9 illustrate examples of a training method of a training apparatus.

FIG. 8 illustrates an example of a training method of a training apparatus. Referring to FIG. 8, a training apparatus 800 includes a first neural network 810 and a second neural network 830.

As described above, the first neural network 810 includes, for example, a first-first neural network 813 configured to extract a speaker feature for each training frame, and a first-second neural network 816 configured to identify a speaker for each of the training frames. The first-first neural network 813 corresponds to a "representation DNN," and the first-second neural network 816 corresponds to a "softmax layer".

The first-first neural network 813 includes a DNN including a plurality of layers. The first-first neural network 813 includes, for example, an input layer, at least one hidden layer, and an output layer. The input layer receives a plurality of frames corresponding to a training speech and transmits the plurality of frames to the hidden layer, and the output layer generates input speaker features, which are output data, based on signals received from nodes of the hidden layer. The at least one hidden layer is disposed between the input layer and the output layer, and the training apparatus 800 converts the plurality of frames corresponding to the training speech, which is input data, into easily predictable values through the hidden layer. Nodes included in the input layer and the at least one hidden layer are connected to each other through edges having connection weights. Nodes included in the hidden layer and the output layer are also connected to each other through edges having connection weights. Among neural networks, a neural network including a plurality of hidden layers is referred to as a DNN.

The hidden layer is a convolution filter or a fully connected layer in a convolutional neural network (CNN), or various types of filters or layers bound based on special functions or features.

The first-first neural network 813 is implemented, for example, as a recurrent neural network (RNN). The RNN is a network in which an output value of a hidden layer of a previous frame is input again into a hidden layer of a current frame. In the RNN, previous outputs affect a computation result of a new output.

The first-second neural network 816 classifies a class, e.g., a speaker (ID), corresponding to a high-level speaker feature output from the first-first neural network 813 and outputs a probability distribution of the speaker feature corresponding to the ID. The first-second neural network 816 outputs the probability distribution of the speaker feature corresponding to the speaker (ID), for example, in a form of a softmax score.

In an example in which softmax scores output from the first-second neural network 816 do not exhibit a significant distinction (or discriminable speaker section) for any speaker (ID) as shown in a graph 801, the training apparatus 800 trains the first-second neural network 816 to output "0" as a discriminable speaker section corresponding to the training frame. In an example in which the softmax scores output from the first-second neural network 816 exhibit similar results for two speakers (IDs) and cause confusion in distinctions as shown in a graph 803, the training apparatus 800 discards the corresponding results without using the results for training. In an example in which the softmax scores exhibit a significant distinction for any one speaker (ID) as shown in a graph 805, the training apparatus 800 trains the first-second neural network 816 to output "1" as a discriminable speaker section corresponding to the training frame. The training apparatus 800 determines whether to determine the discriminable speaker section corresponding to the training frame to be "1" (or "0") or to discard the corresponding results without using the results for training, based on a difference between the softmax scores, for example, a score corresponding to a first best ID and a score corresponding to a second best ID.

In summary, the training apparatus 800 trains the first-first neural network 813 and the first-second neural network 816 based on a speaker recognition result for each of the training frames and a ground truth speaker of the training speech. The training apparatus 800 classifies discriminable speaker sections for the plurality of training frames using the trained first-first neural network 813 and the trained first-second neural network 816.

The second neural network 830 estimates a discriminable speaker section for each of the training frames based on the speaker recognition result for each of the training frames output from the trained first neural network 810 (for example, "0" or "1"). The second neural network 830 is an "attention DNN".

In detail, the training apparatus 800 determines a speaker identification level for each of the training frames based on the speaker recognition result for each of the training frames output from the trained first neural network 810. The speaker identification level for each of the training frames is, for example, a frame-level confidence score. The training apparatus 800 trains the second neural network 830 to estimate a discriminable speaker section for each of the training frames based on the plurality of training frames and the speaker identification level for each of the training frames.

Figure 9:
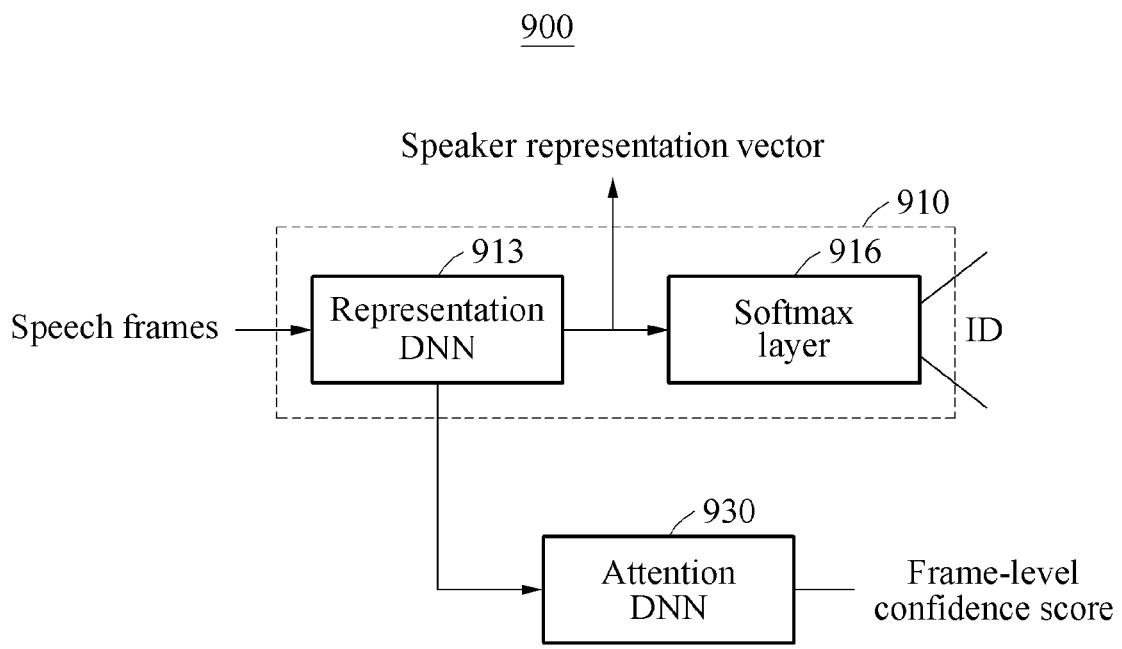

FIG. 9 illustrates an example of a training method of a training apparatus. Referring to FIG. 9, a training apparatus 900 is illustrated. The training apparatus 900 includes a first neural network 910 and a second neural network 930. The first neural network 910 includes a first-first neural network 913 and a first-second neural network 916. An operation of the first neural network 910 is the same as the operation of the first neural network 810 described above, and thus a detailed description of the first neural network 910 will be omitted for conciseness.

The training apparatus 900 trains the second neural network 930 using speaker features output from any one of a plurality of layers of the first-first neural network 913, instead of a plurality of training frames. The training apparatus 900 trains the second neural network 930 to estimate a discriminable speaker section for each of the training frames based on the speaker features output from any one of the plurality of layers of the first-first neural network 913 (any one hidden layer) and a speaker identification level for each of the training frames. An operation of the second neural network 930 excluding the foregoing operation is the same as the operation of the first neural network 910, and thus a detailed description thereof will be omitted for conciseness.

Figure 10:
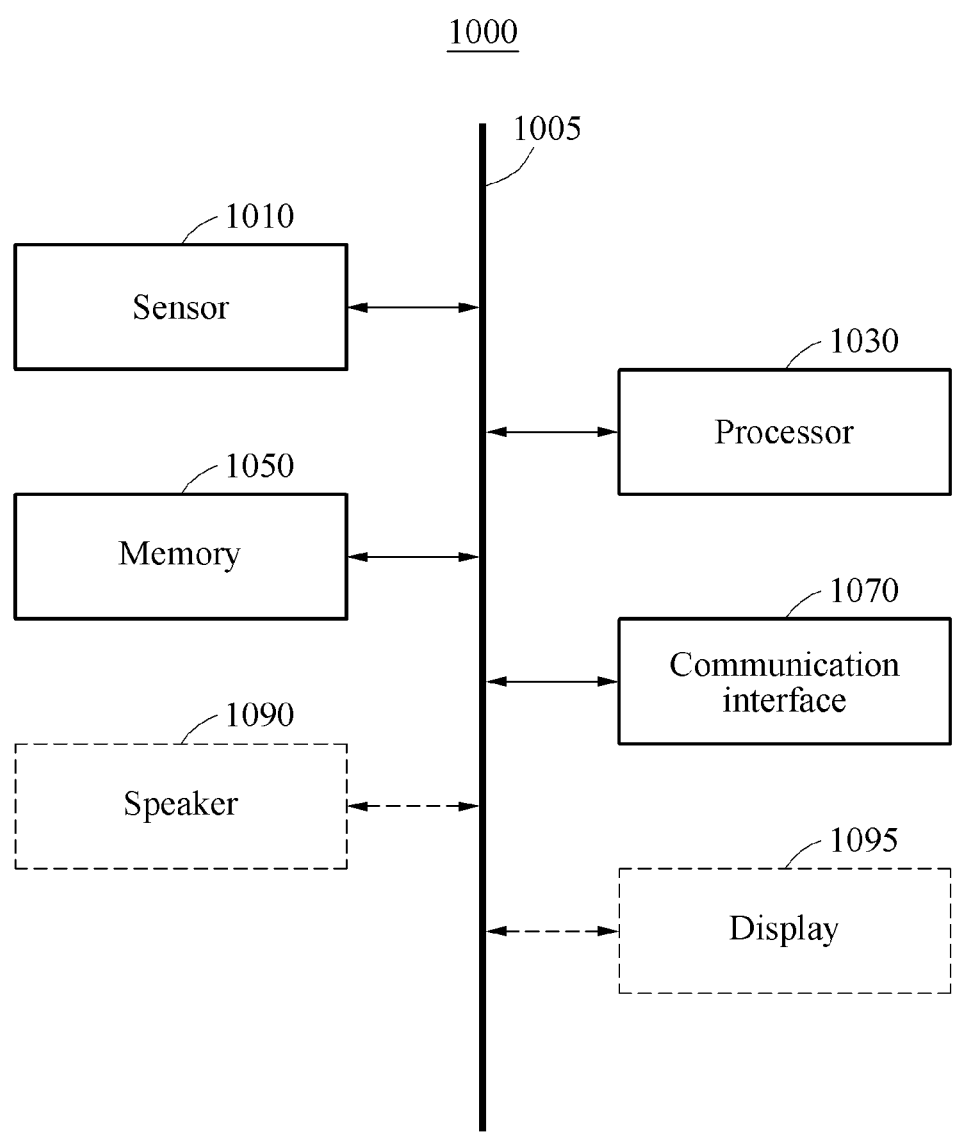
FIG. 10 is a block diagram illustrating an example of a speaker authentication apparatus.

FIG. 10 is a block diagram illustrating an example of a speaker authentication apparatus. Referring to FIG. 10, a speaker authentication apparatus 1000 includes a processor 1030 and a communication interface 1070. The speaker authentication apparatus 1000 further includes a sensor 1010, a memory 1050, a speaker 1090, and a display 1095. The sensor 1010, the processor 1030, the memory 1050, the communication interface 1070, the speaker 1090, and the display 1095 communicate with each other through a communication bus 1005.

The sensor 1010 is, for example, a condenser microphone or a speech detection sensor configured to detect a speech input.

The processor 1030 extracts input speaker features corresponding to a plurality of frames. The processor 1030 estimates discriminable speaker sections corresponding to the plurality of frames. The processor 1030 dynamically matches the input speaker features to pre-enrolled enrolled speaker features based on the discriminable speaker sections. The processor 1030 authenticates a speaker based on a result of the dynamically matched pooling. The processor 1030 aligns enrolled speaker features representing phonemes identical to phonemes represented by the input speaker features and dynamically matches the input speaker features to the aligned enrolled speaker features.

The memory 1050 stores the discriminable speaker sections, estimated by the processor 1030, corresponding to the plurality of frames. The memory 1050 stores a database including the pre-enrolled enrolled speaker features. The memory 1050 is a volatile memory or a non-volatile memory.

The communication interface 1070 receives the plurality of frames corresponding to an input speech. The communication interface 1070 receives the input speech obtained outside of the speaker authentication apparatus 1000. The communication interface 1070 transmits a result of the speaker authentication performed by the processor 1030 to the outside of the speaker authentication apparatus 1000 through the speaker 1090 or the display 1095.

The speaker 1090 outputs the result of the speaker authentication performed by the processor 1030 with voice.

The display 1095 displays the result of the speaker authentication performed by the processor 1030.

In addition, the processor 1030 performs the at least one method described with reference to FIGS. 1 through 9 or an algorithm corresponding to the at least one method. The processor 1030 executes a program and controls the speaker authentication apparatus 1000. Program codes executed by the processor 1030 are stored in the memory 1050. The processor 1030 includes, for example, a central processing unit (CPU) or a graphics processing unit (GPU).

The speaker authentication apparatus 600, the speaker representation DNN 610, 640, the attention DNN 620, 650, the pooling layer 630, 660, the dynamic matcher 670, the comparator 680, the training apparatus 800, the first neural network 810, the second neural network 830, the first-first neural network 813, the first-second neural network 816, the training apparatus 900, the first neural network 910, the first-first neural network 913, the first-second neural network 916, the second neural network 930, the speaker authentication apparatus 1000, the processor 1030, the communication interface 1070, the sensor 1010, the memory 1050, the speaker 1090, the display 1095 and other apparatuses, modules, devices, and other components described herein with respect to FIGS. 1-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speaker authentication method, comprising:
receiving a plurality of frames corresponding to an input speech;
extracting input speaker features corresponding to the plurality of frames;
estimating discriminable speaker sections corresponding to the plurality of frames;
dynamically matching the input speaker features to pre-enrolled enrolled speaker features based on the discriminable speaker sections; and
performing a speaker authentication based on a result of the dynamic matching,
wherein the dynamic matching comprises:
assigning a first weight to an input speaker feature corresponding to a pre-determined short pause among the input speaker features;
assigning a second weight to an input speaker feature corresponding to a speech among the input speaker features; and
dynamically matching each of the first weight-assigned input speaker feature and the second weight-assigned input speaker feature to the pre-enrolled enrolled speaker features.

2. The method of claim 1, wherein the dynamic matching comprises:
selecting input speaker features having discriminable speaker sections greater than or equal to a threshold value; and
dynamically matching the selected input speaker features to the pre-enrolled enrolled speaker features.

3. The method of claim 1, wherein the dynamic matching comprises:
dropping an input speaker feature having a discriminable speaker section less than a threshold value;
dropping a pre-enrolled enrolled speaker feature corresponding to the dropped input speaker feature; and
dynamically matching remaining input speaker features, excluding the dropped input speaker feature, to remaining enrollment speaker features, excluding the dropped pre-enrolled enrollment speaker feature.

4. The method of claim 1, wherein the dynamic matching comprises:

assigning a weight to input speaker features having discriminable speaker sections being greater than or equal to a threshold value; and dynamically matching the weight-assigned input speaker features to the pre-enrolled enrolled speaker features.

5. The method of claim 1, wherein the dynamic matching comprises:

dropping an input speaker feature corresponding to a short pause among the input speaker features; and dynamically matching remaining input features, excluding the dropped input speaker feature, to the pre-enrolled enrolled speaker features.

6. The method of claim 1, wherein the dynamic matching comprises:

aligning the pre-enrolled enrolled speaker features representing phonemes identical to phonemes represented by the input speaker features; and dynamically matching the input speaker features to the aligned pre-enrolled enrolled speaker features.

7. The method of claim 1, wherein the performing comprises:

outputting a distance corresponding to the input speech by accumulating results of the dynamic matching; and performing the speaker authentication based on a result of comparing the distance to a threshold value.

8. The method of claim 1, wherein the extracting comprises extracting the input speaker features based on per-frequency energies of the plurality of frames.

9. A non-transitory computer-readable storage medium storing instructions that, when executed by a processor, cause the processor to perform the speaker authentication method of claim 1.

10. A speaker authentication apparatus, comprising:

a communication interface configured to receive a plurality of frames corresponding to an input speech; and a processor configured to:

extract input speaker features corresponding to the plurality of frames;

estimate discriminable speaker sections corresponding to the plurality of frames;

dynamically match the input speaker features to pre-enrolled enrolled speaker features based on the discriminable speaker sections; and perform a speaker authentication based on a result of the dynamic matching, wherein, for the dynamic matching, the processor is configured to:

assign a first weight to an input speaker feature corresponding to a pre-determined short pause among the input speaker features;

assign a second weight to an input speaker feature corresponding to a speech among the input speaker features; and dynamically match each of the first weight-assigned input speaker feature and the second weight-assigned input speaker feature to the pre-enrolled enrolled speaker features.

11. The apparatus of claim 10, wherein the processor is configured to select input speaker features having discriminable speaker sections greater than or equal to a threshold value, and dynamically match the selected input speaker features to the pre-enrolled enrolled speaker features.

12. The apparatus of claim 10, wherein the processor is configured to drop an input speaker feature having a discriminable speaker section less than a threshold value, and dynamically match remaining input speaker features, excluding the dropped input speaker feature, to the pre-enrolled enrolled speaker features.

13. The apparatus of claim 10, wherein the processor is configured to assign a weight to input speaker features having discriminable speaker sections greater than or equal to a threshold value, and dynamically match the weight-assigned input speaker features to the pre-enrolled enrolled speaker features.

14. A speaker authentication method, comprising:

extracting input speaker features corresponding to speech frames;

determining discriminable speaker sections in each of the speech frames;

dynamically matching select input speaker features, of the extracted input speaker features, to pre-enrolled enrolled speaker features based on the discriminable speaker sections satisfying a criteria; and authenticating a speaker based on the dynamically matched input speaker features, wherein the dynamic matching comprises:

assigning a first weight to an input speaker feature corresponding to a pre-determined short pause among the input speaker features;

assigning a second weight to an input speaker feature corresponding to a speech among the input speaker features; and dynamically matching each of the first weight-assigned input speaker feature and the second weight-assigned input speaker feature to the pre-enrolled enrolled speaker features.

15. The method of claim 14, wherein the input speaker features correspond to phonemes and the discriminable speaker sections comprise of voiced sounds.

16. The method of claim 15, wherein the criteria is satisfied when a discriminable speaker section of the discriminable speaker sections is greater than or equal to a threshold value.

17. The method of claim 15, wherein the criteria is determined based on comparisons of relative weights applied to the discriminable speaker sections.

* * * * *